United States Patent
Yabe

(10) Patent No.: US 7,580,617 B2
(45) Date of Patent: Aug. 25, 2009

(54) ELECTRIC FAN DEVICE AND METHOD OF DRIVING ELECTRIC FAN DEVICE

(75) Inventor: Hiroo Yabe, Susono (JP)

(73) Assignee: Yazaki Corporation, Tokyo (JP)

( * ) Notice: Subject to any disclaimer, the term of this patent is extended or adjusted under 35 U.S.C. 154(b) by 59 days.

(21) Appl. No.: 11/828,634

(22) Filed: Jul. 26, 2007

(65) Prior Publication Data
US 2008/0050101 A1 Feb. 28, 2008

(30) Foreign Application Priority Data
Jul. 26, 2006 (JP) ............................. 2006-202756

(51) Int. Cl.
*H02P 7/29* (2006.01)
(52) U.S. Cl. .................. 388/811; 388/831; 318/268; 318/400.04; 318/400.14; 318/400.17
(58) Field of Classification Search .............. 318/268, 318/266, 400.04, 400.14, 400.17, 400.23; 388/804, 811
See application file for complete search history.

(56) References Cited

U.S. PATENT DOCUMENTS

| 5,767,638 | A  | * | 6/1998 | Wu et al. .............. 318/400.23 |
| 7,184,654 | B2 | * | 2/2007 | Kanamori et al. ...... 318/400.04 |
| 7,218,073 | B2 | * | 5/2007 | Huang et al. ............... 318/599 |
| 7,218,846 | B2 | * | 5/2007 | Wu et al. ............... 318/400.14 |
| 7,233,121 | B2 | * | 6/2007 | Wu et al. ............... 318/400.17 |
| 7,347,167 | B2 | * | 3/2008 | Sugiyama et al. ......... 123/41.11 |
| 2005/0002657 | A1 | * | 1/2005 | Wu et al. .................... 388/831 |
| 2005/0019168 | A1 | * | 1/2005 | Huang et al. ............... 417/44.1 |
| 2006/0056823 | A1 | * | 3/2006 | Wu et al. .................... 388/831 |
| 2006/0165392 | A1 | * | 7/2006 | Kanamori et al. .......... 388/804 |
| 2008/0018274 | A1 | * | 1/2008 | Mori et al. .................. 318/268 |

FOREIGN PATENT DOCUMENTS

JP    2002-142494 A    5/2002

* cited by examiner

*Primary Examiner*—Paul Ip
(74) *Attorney, Agent, or Firm*—Sughrue Mion, PLLC

(57) ABSTRACT

An electric fan device includes a motor which drives an electric fan for a vehicle, a control switch which controls a motor current supplied to the motor, and a control unit which controls an on/off operation of the control switch with pulse-width modulation. The control unit outputs a PWM pulse having a main PWM pulse and a vibration reducing pulse within one cycle to the control switch.

8 Claims, 8 Drawing Sheets

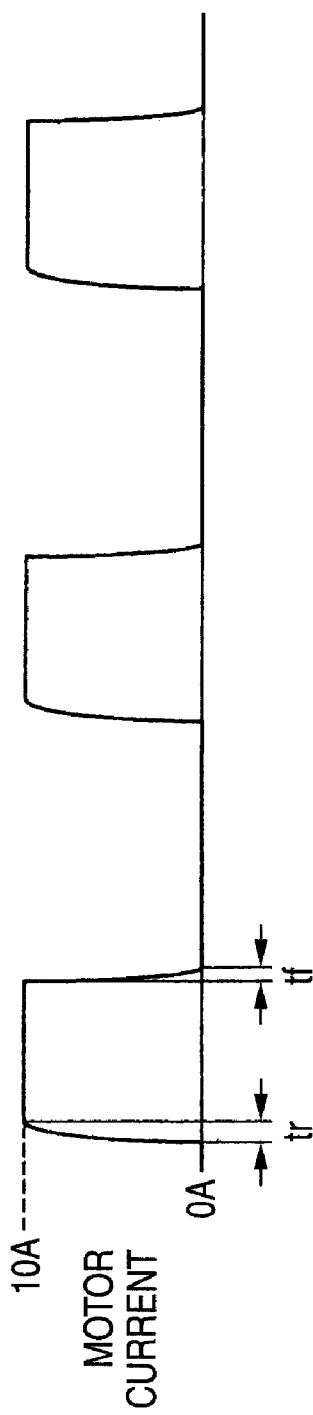
FIG. 8A
FIG. 8B

ELECTRIC FAN DEVICE AND METHOD OF DRIVING ELECTRIC FAN DEVICE

BACKGROUND OF THE INVENTION

The present invention relates to an electric fan device for a vehicle and a method of driving an electric fan device for a vehicle applied to a cooling fan of, for instance, a radiator or a condenser for a vehicle.

Ordinarily, the radiator fan or the condenser fan as the electric fan device mounted on the vehicle is operated or stopped in accordance with the state of the water temperature of the radiator or the pressure of the condenser. An operation is carried out by adjusting a rotating speed stepwise in accordance with a quantity of required cooling.

Usually, the electric fan device for the vehicle of this kind adjusts the rotating speed to three stages including the stop of the radiator fan and the condenser fan, a rotation of 50% and a rotation of 100% by switching a relay to adjust a quantity of cooling to a desired value.

However, when the rotating speed is adjusted by switching the relay, since the adjustment of the rotating speed is limited to the three stages including the stop, the rotation of 50% and the rotation of 100%, a disadvantage arises that a quantity of cooling cannot be properly adjusted to the quantity of required cooling.

Thus, as a device for solving such a disadvantage, an electric fan for a vehicle is provided in which a radiator fan and a condenser fan are driven by using a semiconductor switch element that is PWM controlled. As described above, the radiator fan and the condenser fan are driven by using the semiconductor switch element that is PWM controlled, so that the rotating speed of them can be adjusted without stages.

However, in the above-described electric fan device for the vehicle, not only a circuit is required for treating noise to prevent a transmitting noise generated from the semiconductor switch element during switching a high frequency from being fed back to a battery line, but also heat generated due to a switching loss by switching the high frequency is undesirably increased to enlarge a heat radiating structure.

As a device for solving the above-described disadvantage, Patent Document 1 proposes an electric fan device for a vehicle in which a motor current supplied to a fan motor in the fan is controlled by a semiconductor switch element and the switching operation of the semiconductor switch element is PWM controlled under a frequency of several ten Hz or lower by a control circuit to suppress the generation of transmitting noise during the switching operation and reduce a heat generation due to a switching loss.

Specifically, in the electric fan device for the vehicle disclosed in the Patent Document 1, as shown in FIG. 6, an anode voltage from a battery B is supplied in order to a fan motor in a radiator fan F1 and a part between a source and a drain of a semiconductor switch element T1 through a relay R4 operating in accordance with an on/off of an ignition switch IG, and supplied in order to a fan motor in a condenser fan F2 and a part between a source and a drain of a semiconductor switch element T2 in parallel therewith.

Further, the on/off operations of the semiconductor switch elements T1 and T2 are controlled and the fan motors in the fans F1 and F2 are respectively driven by a fan control circuit 5 in accordance with driving signals from a FAN.TEMP switch 7 and an A/C.PRESS switch 9. At this time, a duty ratio is adjusted in accordance with a detection result detected in a pressure detecting sensor and a water temperature detecting sensor, and the switching operations of the semiconductor switch elements T1 and T2 are PWM controlled by a prescribed low frequency of several tens of Hz or lower.

[Patent Document 1] JP-A-2002-142494

When the operation of the electric fan device for the vehicle disclosed in the Patent Document 1 is considered, below-described things can be understood. Namely, FIG. 7 is a wave form diagram obtained by a measurement when one fan motor is used in the electric fan device for the vehicle disclosed in the Patent Document 1.

In FIG. 7, the frequency of the PWM control by the fan control circuit 5 is set to 12 Hz and the duty ratio is set to 52%. Further, in FIG. 7, a1 designates an output signal of the fan control circuit 5, b1 designates a value obtained by converting an acceleration of a mechanical vibration generated in a bracket for attaching the fan motor to a voltage, and c1 designates a motor current supplied to the fan motor.

It is recognized from FIG. 7 that the mechanical vibration designated by b1 is generated in the bracket for attaching the fan motor synchronously with the rise and the fall of the motor current designated by c1 that is supplied to the fan motor.

FIG. 8 schematically shows the change of the motor current of the fan motor. FIG. 8(a) shows an output from the fan control circuit 5. FIG. 8(b) shows the motor current supplied to the fan motor. Here, the rise time of the motor current supplied to the fan motor is represented by tr and the fall time is represented by tf.

Since the torque of the fan motor is proportional to the motor current, the torque rapidly varies during the rise time tr and the fall time tf. Thus, during the rise time, a distortion is applied to the bracket for supporting the fan motor in an opposite direction to the rotation of the fan motor, so that the distortion to the bracket is released during the fall time.

As described above, during the rise time and the fall time of the current supplied to the fan motor, the distortion and the release of the distortion occur in the bracket for supporting the fan motor, so that the mechanical vibration is generated in the bracket.

Since such a mechanical vibration is transmitted to an interior of the vehicle through a chassis, a problem arise that this vibration gives an unpleased feeling to a driver or the abrasion of various sliding parts is accelerated.

SUMMARY OF THE INVENTION

The present invention is developed by considering the above-described circumstances and it is an object of the present invention to provide an electric fan device for a vehicle and a method of driving the electric fan device that can solve the above-described problems.

An electric fan device for a vehicle of the present invention concerns an electric fan device, comprising:

a motor which drives an electric fan for a vehicle;

a control switch which controls a motor current supplied to the motor; and a control unit which controls an on/off operation of the control switch with pulse-width modulation, wherein the control unit outputs a PWM pulse having a main PWM pulse and a vibration reducing pulse within one cycle to the control switch.

Preferably, the vibration reducing pulse is set to 0 to one before the main PWM pulse, and set to one or more after the main PWM pulse.

Preferably, a pulse width of the vibration reducing pulse is set to be smaller than a rise time of the motor current. A pulse interval between the vibration reducing pulse and the main PWM pulse is set to be smaller than a fall time of the motor current.

Preferably, the main PWM pulse is stored as a wave form pattern having a plurality of pulse widths. The wave form pattern is retrieved in accordance with a rotating speed of the motor.

According to the present invention, there is also provided a method of driving an electric fan device which drives an electric fan for a vehicle, the method comprising:

controlling a motor current supplied to a motor for driving the fan by turning on/off operation; and controlling the on/off operation with pulse-width modulation by a PWM pulse having a main PWM pulse and a vibration reducing pulse within one cycle.

Preferably, the method further comprising:

storing the main PWM pulse as a wave form pattern having a plurality of pulse widths; and retrieving the wave form pattern in accordance with a rotating speed of the motor.

In the electric fan device for the vehicle and the method of driving the electric fan device for the vehicle of the present invention, in the PWM control that the motor current supplied to the motor for driving the fan is controlled by the on/off operation, the PWM pulse obtained by adding the vibration reducing pulse to the main PWM pulse is used within one cycle. Thus, the rise time and the fall time of the motor current are extended to reduce the variation of the torque of the motor.

According to the electric fan device for the vehicle and the driving method for the electric fan device of the present invention, the variation of the torque of the motor is mitigated, so that the bracket for attaching the motor is not greatly distorted at a time, and fractionally distorted. Accordingly, the mechanical vibration of the bracket can be reduced to decrease the mechanical vibration transmitted to an interior of the vehicle through a chassis and assuredly prevent a driver from having a discomfort or the abrasion of various sliding parts from being accelerated.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 8A and 8B are diagrams schematically showing the change of a current of the fan motor shown in FIG. 6.

DETAILED DESCRIPTION OF THE PREFERRED EMBODIMENTS

According to this embodiment, in a PWM control by a control unit for controlling a motor current supplied to a motor for driving a fan by the on/off operation of a control switch, a PWM pulse that is obtained by adding a vibration reducing pulse to a main PWM pulse within one cycle is used. Thus, the rise time and the fall time of the motor current are extended so as to reduce the variation of the torque of the motor. A bracket for attaching the motor is not greatly distorted at a time, and fractionally distorted to reduce the mechanical vibration of the bracket.

Thus, the mechanical vibration transmitted to an interior of a vehicle through a chassis is decreased so that a driver can be assuredly prevented from having a discomfort or the abrasion of various sliding parts can be prevented from being accelerated.

Embodiment

Figure 1:
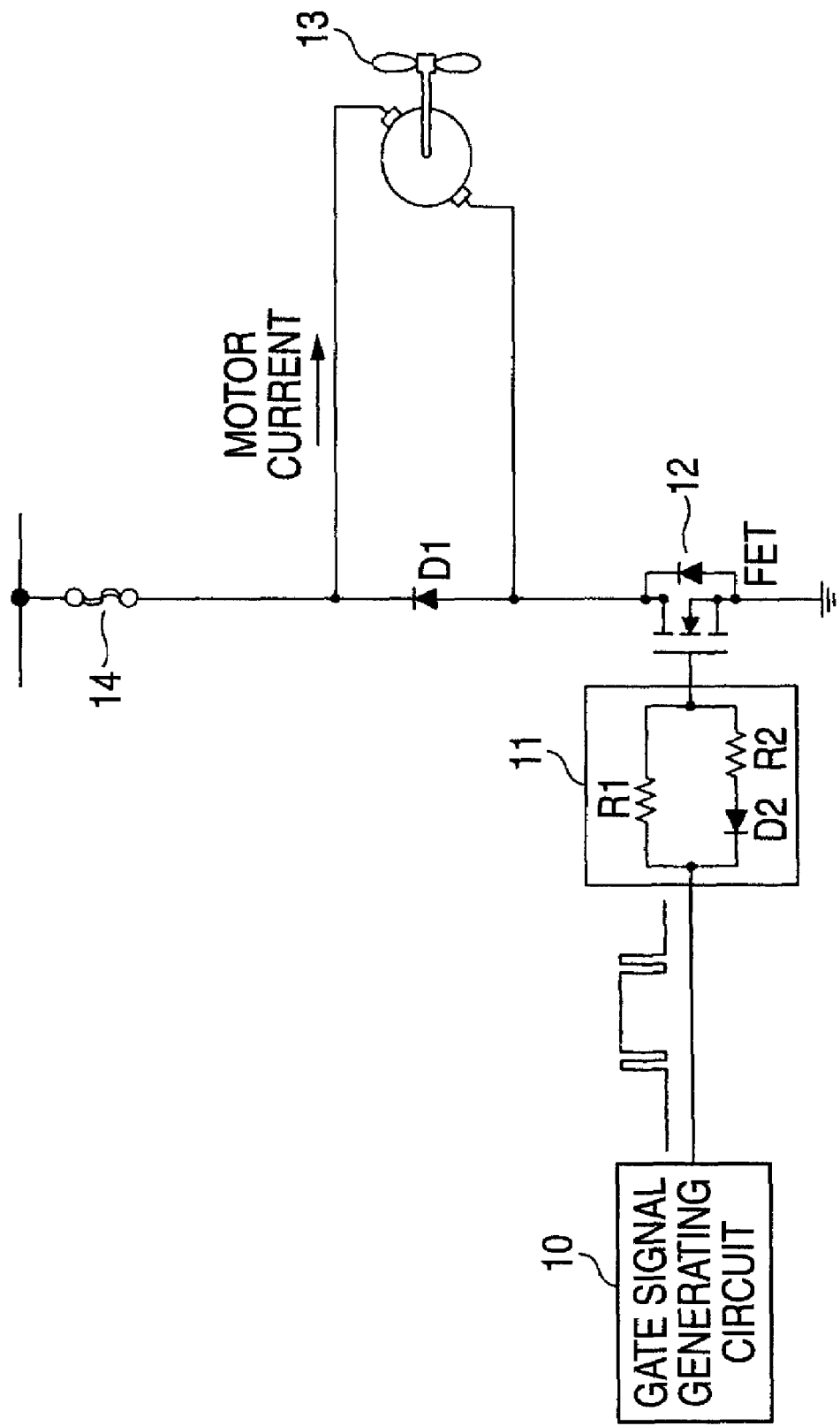
FIG. 1 is a diagram for explaining one embodiment of an electric fan device for a vehicle of the present invention.

Now, the detail of an embodiment of the present invention will be described below. FIG. 1 is a diagram for explaining one embodiment of an electric fan device for a vehicle of the present invention.

As shown in FIG. 1, the electric fan device for the vehicle includes a gate signal generating circuit 10, a gate signal shaping circuit 11, a semiconductor switch element 12 and a fan motor 13. In the drawing, D1 designates a diode connected in parallel with the fan motor 13. 14 designates a fuse. Further, the gate signal generating circuit 10 and the gate signal shaping circuit 11 form a control unit. Further, the semiconductor switch element 12 forms a control switch and the fan motor 13 forms a motor.

The gate signal generating circuit 10 generates a PWM (pulse width modulation) pulse of a voltage necessary for an operation of the semiconductor switch element 12. The PWM pulse generated by the gate signal generating circuit 10 includes a vibration reducing pulse and the detail thereof will be described below.

The gate signal shaping circuit 11 includes resistances R1 and R2 and a diode D2 to shape the PWM pulse generated by the gate signal generating circuit 10 so as to reduce a transmitting noise and supply the PWM pulse to the gate of the semiconductor switch element 12.

The semiconductor switch element 12 is an FET (field effect transistor) and turned on and off in accordance with the PWM pulse from the gate signal generating circuit 10 shaped by the gate signal shaping circuit 11. When the semiconductor switch element 12 is turned on, an anode voltage (VB) from a battery (an illustration is omitted) through a relay (an illustration is omitted) operating in accordance with an on/off operation of an ignition switch (an illustration is omitted) is supplied to the fan motor 13 through the fuse 14.

The fan motor 13 receives a motor current from the battery (the illustration is omitted) depending on the on/off operation of the semiconductor switch element 12 that is PWM controlled to rotate a fan. For the convenience of explanation, the fan motor 13 is shown under a state that it is provided in either of a radiator fan or a condenser fan.

Figure 2:
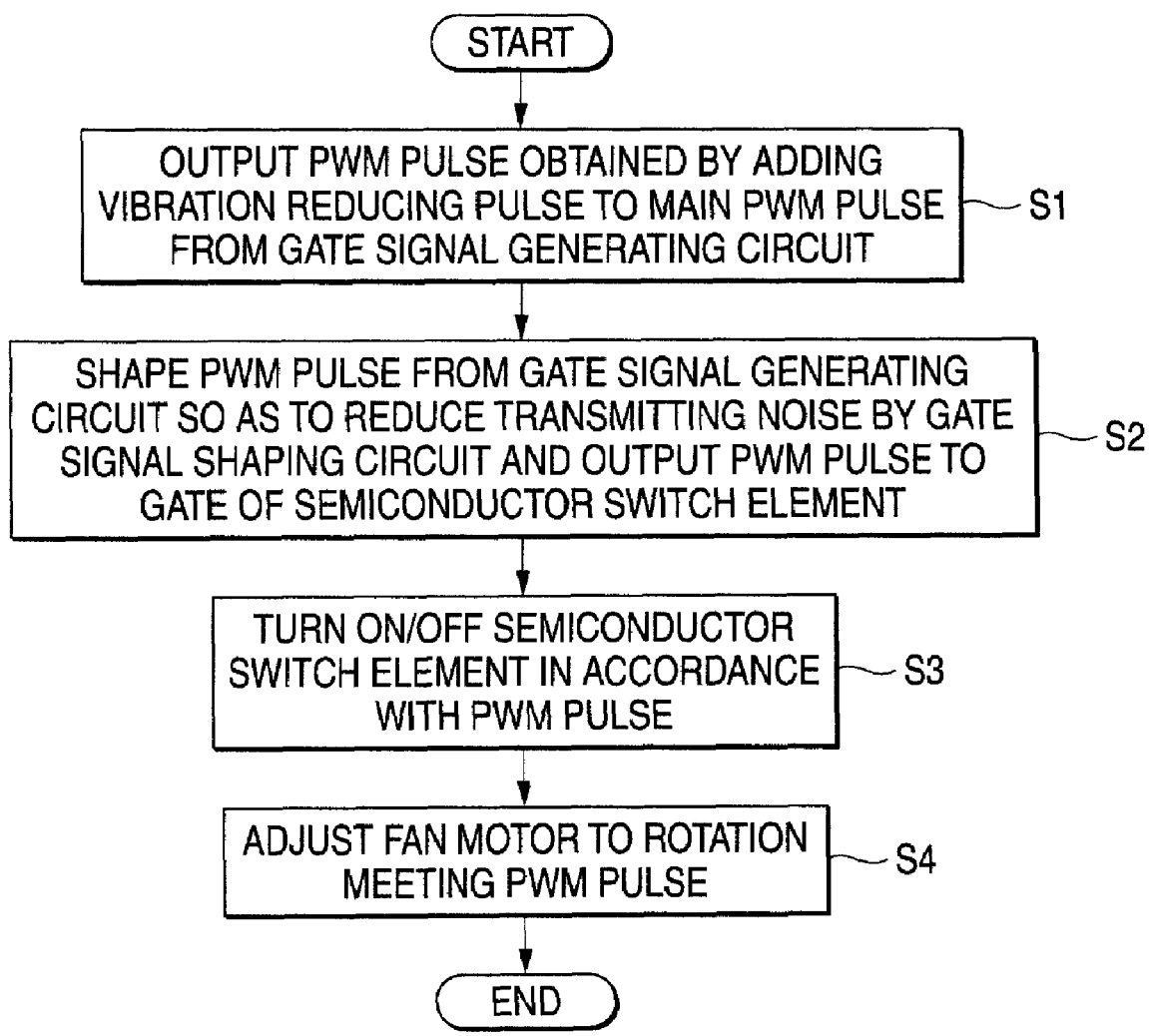
FIG. 2 is a flowchart for explaining a driving method of the electric fan device for the vehicle shown in FIG. 1.

Now, an operation of the electric fan device for the vehicle will be described below. Initially, as shown in FIG. 2, the PWM pulse obtained by adding the vibration reducing pulse to a below-described main pulse is outputted from the gate signal generating circuit 10 to drive the fan motor 13 (step S1). At this time, the PWM pulse from the gate signal generating circuit 10 is shaped so as to reduce a transmitting noise by the gate signal shaping circuit 11 and outputted to the gate of the semiconductor switch element 12 (step S2).

Thus, the semiconductor switch element 12 is turned on/off in accordance with the PWM pulse (step S3), so that when the semiconductor switch element 12 is turned on, the anode voltage (VB) from the battery (the illustration is omitted) through the relay (the illustration is omitted) operating depending on the on/off operation of the ignition switch (the illustration is omitted) is supplied to the fan motor 13 through the fuse 14. Accordingly, the fan motor 13 is adjusted to a rotation meeting the PWM pulse (step S4).

Figure 3:
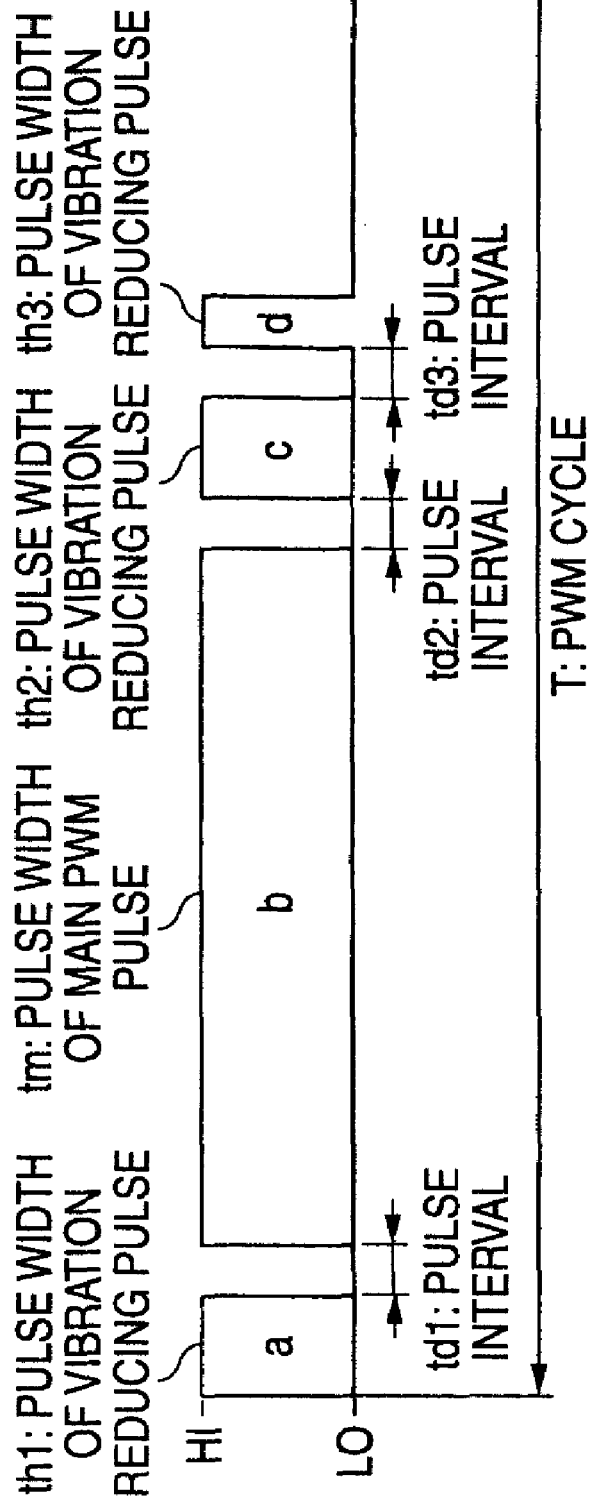
FIG. 3 is a wave form diagram for explaining a gate pulse to a semiconductor switch element from a gate signal generating circuit obtained through a gate signal shaping circuit shown in FIG. 1.

Thus, a gate pulse as the PWM pulse to the semiconductor switch element 12 from the gate signal generating circuit 10 that is obtained through the gate signal shaping circuit 11 has about 4 to 15 V of Hi (during on) and about 1.5 to −15V of Lo (during off) as shown in FIG. 3.

The PWM pulse from the gate signal generating circuit 10 includes 0 or one vibration reducing pulse a, the main PWM pulse b subsequent to the vibration reducing pulse a and one or more vibration reducing pulses c and d subsequent to the main PWM pulse b that are generated within one cycle.

The number of generations of the vibration reducing pulses a, c and d are increased so that the reducing effect of the mechanical vibration of a bracket for attaching the fan motor 13 is increased. However, even when the number of generations of the vibration reducing pulses is increased to a required number or more, the reducing effect of the mechanical vibration reaches an upper limit. Further, when the number of generations of the vibration reducing pulses a, c and d is increased to the required number or more, the number of switching operations of the semiconductor switch element 12 is increased to increase the heat generation of the semiconductor switch element 12 or the diode D1.

According to a result of an experiment, it could be recognized that when the number of the vibration reducing pulses a before the main PWM pulse b is 0 or one, and when the number of the vibration reducing pulses c and d after the main PWM pulse b is one or two, the reducing effect of the mechanical vibration of the bracket for attaching the fan motor 13 is effective.

Here, tm indicates a pulse width of the main PWM pulse b. When a duty ratio for obtaining a necessary rotating speed of the fan motor 13 is n and a PWM cycle is T, tm=T/n is established. Further, tn1, tn2 and tn3 respectively indicate the pulse width of the vibration reducing pulses a, c and d.

Further, td1 indicates a pulse interval between the vibration reducing pulse a and the main PWM pulse b, td2 indicates a pulse interval between the main PWM pulse b and the vibration reducing pulse c, and td3 indicates a pulse interval between the vibration reducing pulse c and the vibration reducing pulse d.

Here, tn1, tn2 and tn3 are preferably set to be smaller than tr (a rise time) and td1, td2 and td3 are preferably set to be smaller than tf (a fall time). tr (the rise time) and tf (the fall time) respectively indicate the time in the motor current described in FIG. 8(b). Further, the tn1, tn2 and tn3 that are respectively the pulse widths of the vibration reducing pulses a, b and c may be the same or different. Further, the pulse intervals td1, td2 and td3 may be respectively the same or different.

Even when the pulse width tm of the main PWM pulse b is changed to change the rotating speed of the fan motor 13, the pulse widths tn1, tn2 and tn3 and the pulse intervals td1, td2 and td3 of the vibration reducing pulses are respectively constant.

In the PWM pulse from the gate signal generating circuit 10, the number of wave form patterns of the main PWM pulse b is set to, for instance, 9 patterns provided at intervals of 10% from 10 to 90% and previously stored in the gate signal generating circuit 10. The wave form pattern meeting a required rotating speed of the fan motor 13 can be called and outputted.

Thus, the fan motor 13 may have 11 patterns of rotations including a rotation of 0% (stop) and a rotation of 100% so that a quantity of cooling can be properly set to a quantity of desired cooling.

Here, the wave form patterns of the main pulse b are set, for instance, at intervals of 10%, however, the present invention is not limited thereto. A reference clock may be formed by dividing the PWM cycle T into 256 so that the pulse width of the main PWM pulse b is externally changed by a digital value of, for instance, 6 bits.

Then, when the PWM pulse as shown in FIG. 3 is outputted from the gate signal generating circuit 10, further shaped so as to reduce the transmitting noise by the gate signal shaping circuit 11 and inputted to the gate of the semiconductor switch element 12, the rise time tr and the fall time tf of the motor current supplied to the fan motor 13 explained in FIG. 8(b) are extended.

As a result, the variation of the torque of the fan motor 13 is mitigated and the bracket for attaching the fan motor 13 is not greatly distorted at a time and distorted fractionally, so that the mechanical vibration of the bracket is reduced.

Figure 4:
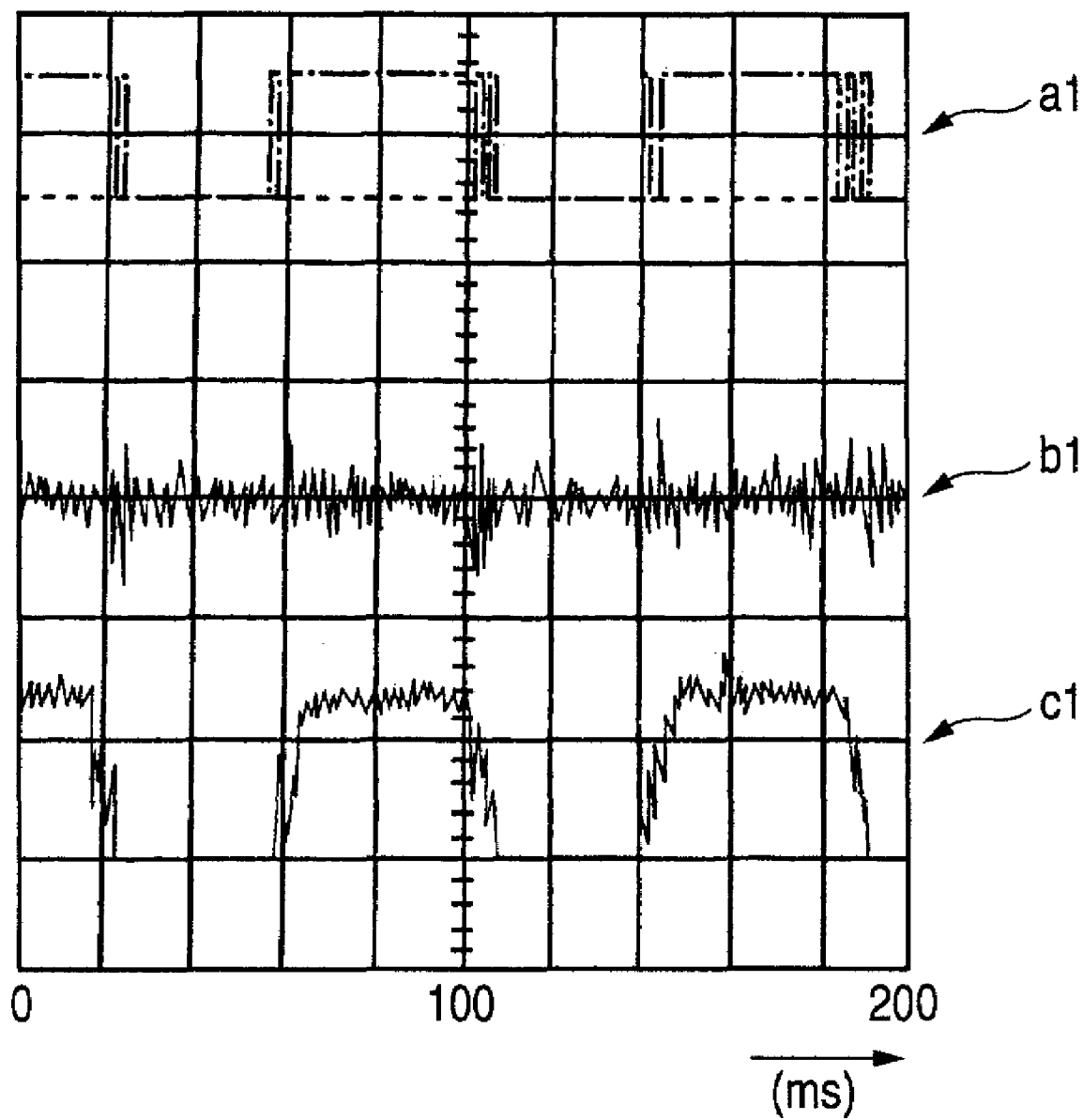
FIG. 4 is a wave form diagram obtained when a fan motor of FIG. 1 is operated.

FIG. 4 is a wave form diagram when the fan motor 13 is operated. In FIG. 4, a frequency of the PWM pulse outputted from the gate signal generating circuit 10 is set to 12 Hz, the PWM cycle T is set to 83.3 ms and the duty ratio is set to 50%. Namely, the rotating speed of the fan motor 13 is substantially the same as that when the duty ratio is set to 52% explained in FIG. 7.

Further, in the PWM pulse outputted from the gate signal generating circuit 10, as described in FIG. 3, the one vibration reducing pulse a is generated before the main PWM pulse b, and the two vibration reducing pulses c and d are generated after the main PWM pulse b within one cycle.

Further, the pulse widths tn1, tn2 and tn3 of the vibration reducing pulses a, c and d are respectively set to about 1.2 ms and the pulse intervals td1, td2 and td3 of them are respectively set to about 0.8 ms.

Further, a1 designates an output signal from the gate signal generating circuit 10. b1 designates a value obtained by converting the acceleration of the mechanical vibration generated in the bracket for attaching the fan motor 13 to a voltage. c1 designates a current supplied to the fan motor 13.

Figure 7:
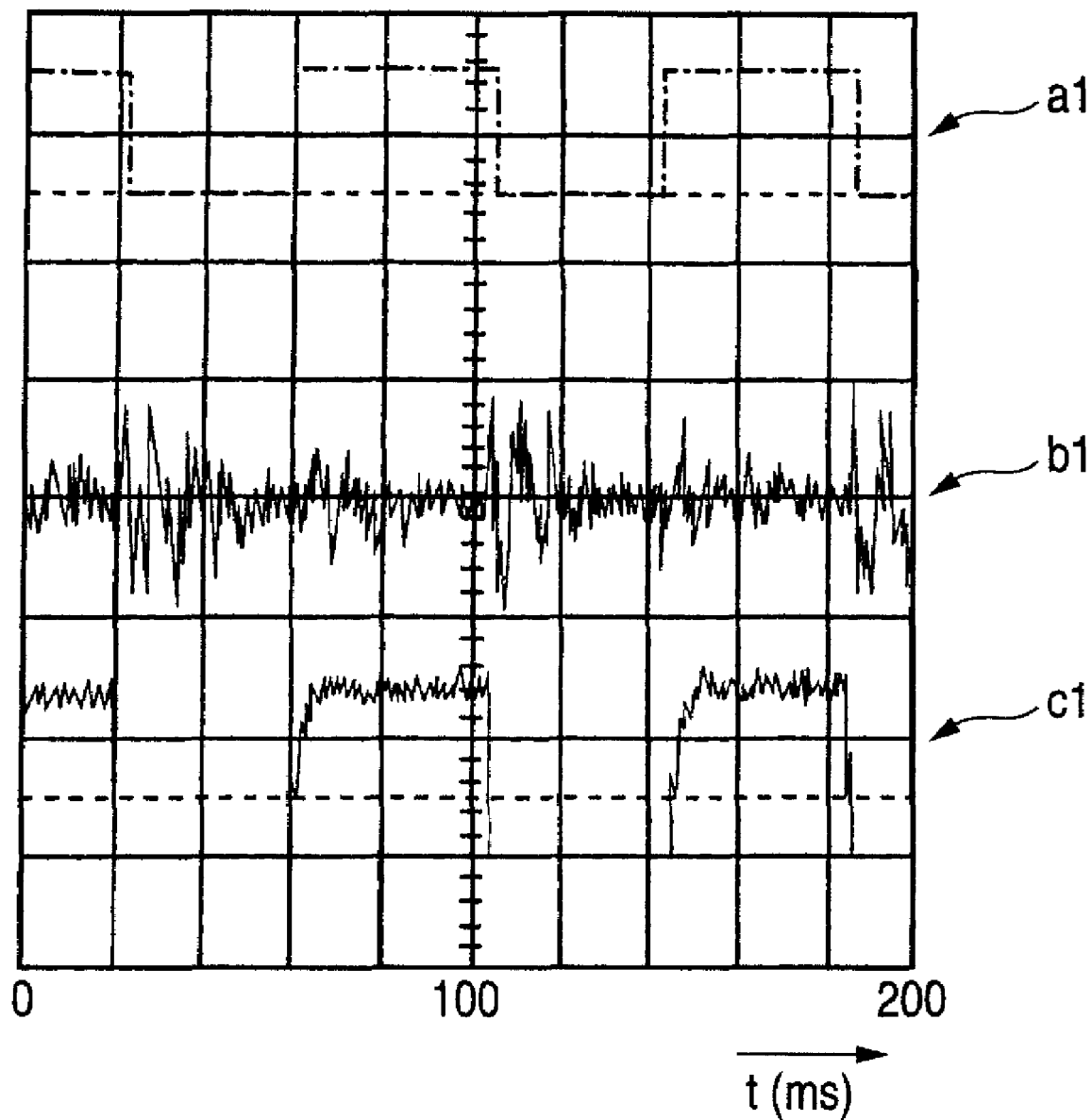
FIG. 7 is a wave form diagram showing the case that a fan motor shown in FIG. 6 is operated.

As apparently understood by comparing FIG. 4 with FIG. 7, the peak value of the mechanical vibration generated in the bracket for attaching the fan motor designated by b1 is reduced to about a half. This phenomenon arises, as described above, because since the one vibration reducing pulse a is allowed to be generated before the main PWM pulse b and the two vibration reducing pulses c and d are allowed to be generated after the main PWM pulse b, the rise time tr and the fall time tf of the motor current designated by c1 that is supplied to the fan motor 13 are extended. Thus, the variation of the torque of the fan motor 13 is mitigated, so that the bracket for attaching the fan motor 13 is not greatly distorted at a time and distorted fractionally.

As described above, in this embodiment, in the PWM control that the motor current supplied to the fan motor 13 for driving the fan is controlled by the on/off operation of the semiconductor switch element 12, the PWM pulse obtained by adding the vibration reducing pulses to the main PWM pulse is outputted from the gate signal generating circuit 10 within one cycle, so that the rise time and the fall time of the motor current are extended. Thus, the variation of the torque of the fan motor 13 can be mitigated, and the bracket for attaching the fan motor 13 is not greatly distorted at a time and fractionally distorted. Accordingly, the mechanical vibration of the bracket can be reduced.

Thus, the mechanical vibration transmitted to an interior of a vehicle through a chassis is decreased so that a driver can be assuredly prevented from having a discomfort or the abrasion of various sliding parts can be prevented from being accelerated.

Further, in this embodiment, since the number of the vibration reducing pulses a before the main PWM pulse b is 0 or one, and the number of the vibration reducing pulses c and d after the main PWM pulse b is one or two, the reducing effect of the mechanical vibration of the bracket for attaching the fan motor 13 can be made to be effective. Further, the increase of heat generation of the semiconductor switch element 12 or the diode D1 due to the increase of the number of times of switching of the semiconductor switch element can be suppressed.

Further, in this embodiment, since the pulse widths tn1, tn2 and tn3 of the vibration reducing pulses are set to be smaller than the rise time of the motor current and the pulse intervals td1, td2 and td3 between the vibration reducing pulses and the main PWM pulse are set to be smaller than the fall time of the motor current, the above-described riser time and the fall time of the motor current can be extended.

Further, in this embodiment, in the PWM pulse from the gate signal generating circuit 10, the number of wave form patterns of the main PWM pulse b is set to, for instance, 9 patterns provided at intervals of, for instance, 10% from 10 to 90% and previously stored in the gate signal generating circuit 10.

The wave form pattern meeting a required rotating speed of the fan motor 13 is called and outputted. Thus, the fan motor 13 may have 11 patterns of rotations including a rotation of 0% (stop) and a rotation of 100% so that a quantity of cooling can be properly set to a quantity of desired cooling.

Further, in this embodiment, the reference clock may be formed by dividing the PWM cycle T into 256 so that the pulse width of the main PWM pulse b is externally changed by a digital value of, for instance, 6 bits. In this case, the rotation of the fan motor 13 can be controlled by a digital control.

Further, in this embodiment, since the PWM pulse generated in the gate signal generating circuit 10 is shaped so as to reduce the transmitting noise by the gate signal shaping circuit 11 and outputted to the semiconductor switch element 12, the on/off operation of the semiconductor switch element 12 can be controlled by a proper PWM pulse.

Figure 5:
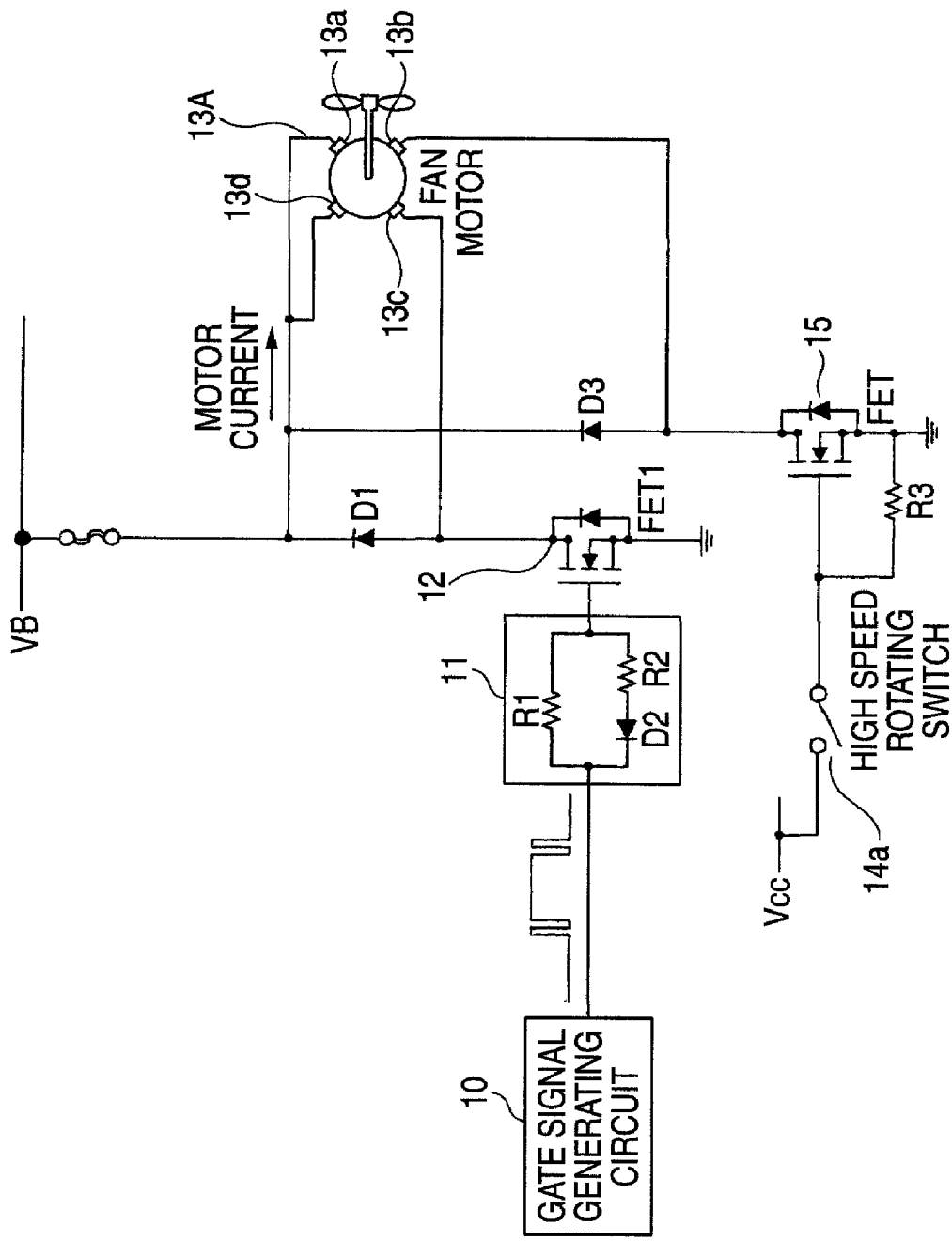
FIG. 5 is a diagram for explaining another electric fan device for a vehicle when the structure of the electric fan device for the vehicle of FIG. 1 is changed.
Figure 6:
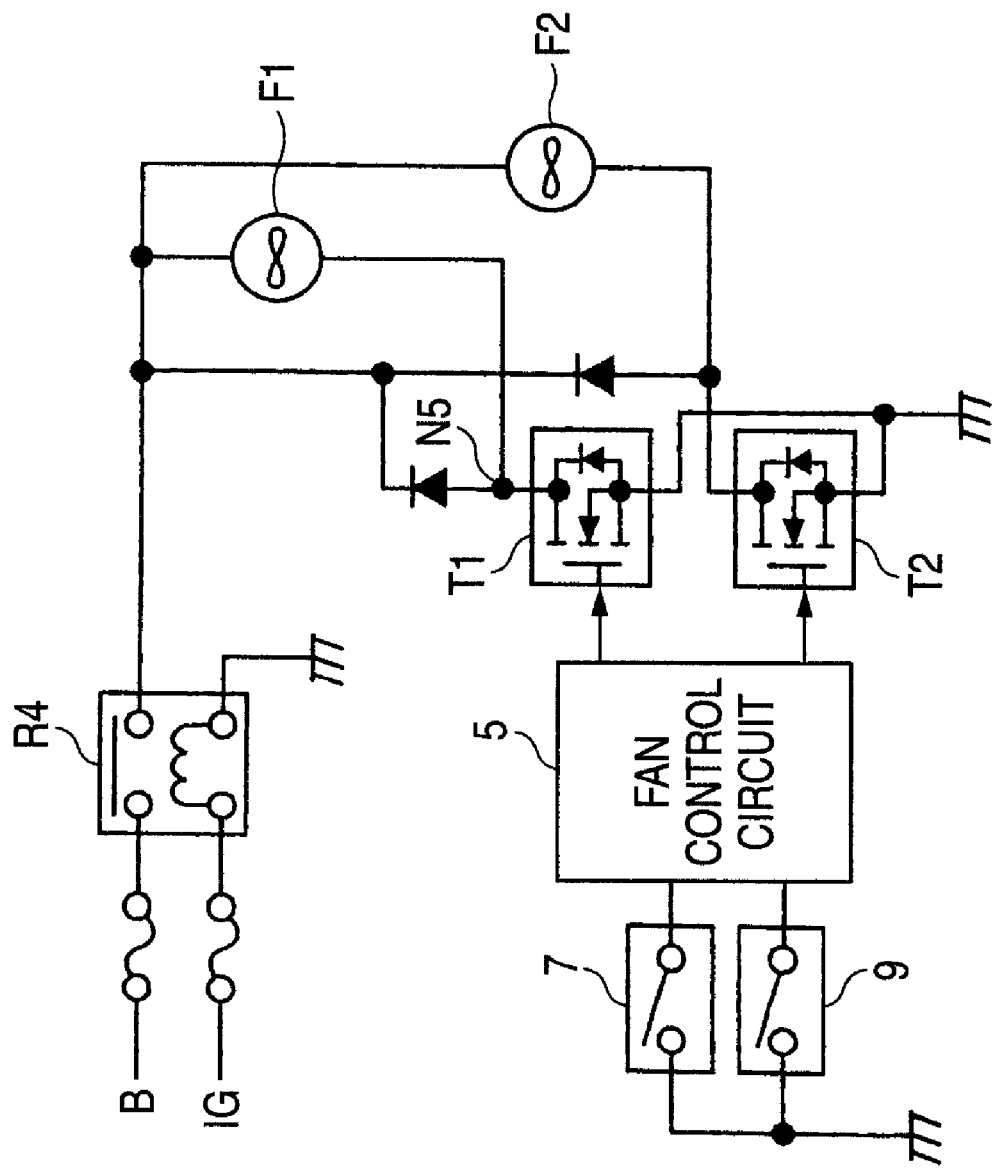
FIG. 6 is a diagram for explaining a usual electric fan device for a vehicle.

In this embodiment, as the fan motor 13, a double-pole motor is used, however, the present invention is not limited to this embodiment. The present invention may be applied to a fan motor 13A having two pairs of brushes 13a to 13d as shown in FIG. 5.

In this case, an anode voltage (VB) from a battery (an illustration is omitted) when a semiconductor switch element 12 is turned on/off by a PWM pulse from a gate signal generating circuit 10 through a gate signal shaping circuit 11 is applied to a first pair of brushes 13a and 13c.

Further, a semiconductor switch element 15 turned on/off by a high speed rotating switch 14a is added so that a source voltage (Vcc) meeting the on/off operation of the semiconductor switch element 15 is applied to a second pair of brushed 13b and 13d.

Also in this case, the variation of the torque of the fan motor 13A is mitigated, a bracket for attaching the fan motor 13A is not greatly distorted at a time and a mechanical vibration is reduced.

The present invention is not limited to a control of the fan motor for a vehicle and may be applied to a control for a cooling fan motor mounted on a personal computer or a control of a motor of a domestic electric product such as an electric fan.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-202756 filed on Jul. 26, 2006, the contents of which are incorporated herein for reference.

What is claimed is:

1. An electric fan device, comprising:
   a motor which drives an electric fan for a vehicle;
   a control switch which controls a motor current supplied to the motor; and
   a control unit which controls an on/off operation of the control switch with pulse-width modulation,
   wherein the control unit outputs a PWM pulse having a main PWM pulse and at least one vibration reducing pulse within one cycle to the control switch.

2. The electric fan device according to claim 1, wherein the at least one vibration reducing pulse comprises zero or one vibration reducing pulses before the main PWM pulse and one or more vibration reducing pulses after the main PWM pulse.

3. The electric fan device according to claim 1, wherein a pulse width of the at least one vibration reducing pulse is set to be smaller than a rise time of the motor current; and
   wherein a pulse interval between the at least one vibration reducing pulse and the main PWM pulse is set to be smaller than a fall time of the motor current.

4. The electric fan device according to claim 1, wherein the main PWM pulse is stored as a wave form pattern having a plurality of pulse widths; and
   wherein the wave form pattern is retrieved in accordance with a rotating speed of the motor.

5. A method of driving an electric fan device which drives an electric fan for a vehicle, the method comprising:
   controlling a motor current supplied to a motor for driving the fan by an on/off operation; and
   controlling the on/off operation with pulse-width modulation by a PWM pulse having a main PWM pulse and at least one vibration reducing pulse within one cycle.

6. The method according to claim 5, wherein the at least one vibration reducing pulse comprises zero or one vibration reducing pulses before the main PWM pulse and one or more vibration reducing pulses after the main PWM pulse.

7. The method according to claim 5, wherein a pulse width of the at least one vibration reducing pulse is set to be smaller than a rise time of the motor current; and
   wherein a pulse interval between the at least one vibration reducing pulse and the main PWM pulse is set to be smaller than a fall time of the motor current.

8. The method according to claim 5, further comprising:
   storing the main PWM pulse as a wave form pattern having a plurality of pulse widths; and
   retrieving the wave form pattern in accordance with a rotating speed of the motor.

* * * * *